(12) United States Patent
Ning

(10) Patent No.: US 7,929,221 B2
(45) Date of Patent: Apr. 19, 2011

(54) ULTRA-WIDE ANGLE OBJECTIVE LENS

(76) Inventor: Alex Ning, San Marcos, CA (US)

( * ) Notice: Subject to any disclaimer, the term of this patent is extended or adjusted under 35 U.S.C. 154(b) by 261 days.

(21) Appl. No.: 12/293,711

(22) PCT Filed: Nov. 15, 2007

(86) PCT No.: PCT/US2007/001106
§ 371 (c)(1),
(2), (4) Date: Sep. 19, 2008

(87) PCT Pub. No.: WO2007/120370
PCT Pub. Date: Oct. 25, 2007

(65) Prior Publication Data
US 2009/0219631 A1    Sep. 3, 2009

Related U.S. Application Data

(60) Provisional application No. 60/791,032, filed on Apr. 10, 2006.

(51) Int. Cl.
*G02B 13/04* (2006.01)
*G02B 13/18* (2006.01)

(52) U.S. Cl. ........ 359/753; 359/752; 359/749; 359/713; 359/714; 359/715

(58) Field of Classification Search .......... 359/713–715, 359/749–753
See application file for complete search history.

(56) References Cited

U.S. PATENT DOCUMENTS

| | | | |
|---|---|---|---|
| 4,957,355 A | 9/1990 | Sato | |
| 5,861,999 A * | 1/1999 | Tada | 359/752 |
| 6,377,404 B1 | 4/2002 | Goosey | |
| 6,687,061 B2 * | 2/2004 | Sensui | 359/749 |
| 6,781,770 B1 | 8/2004 | Chang | |
| 7,023,628 B1 | 4/2006 | Ning | |
| 7,286,302 B2 * | 10/2007 | Ohzawa et al. | 359/749 |
| 7,301,578 B2 * | 11/2007 | Ohzawa et al. | 348/340 |
| 2005/0219715 A1 * | 10/2005 | Kimura et al. | 359/749 |

* cited by examiner

*Primary Examiner* — Jordan M. Schwartz

(57) ABSTRACT

A ultra-wide angle objective lens comprising a first group having a first lens element having a convex object surface facing the object and a concave image surface facing the image plane, and a second aspheric lens element, the second aspheric lens element having a varying power that is negative at its vertex; and that increases positively with radial distance from the vertex. A second group has at least one lens element and a positive power. A third group has at least a first and a second lens element and a positive power. The ratio of the total track to the focal length satisfies the condition that $TT/fo=<33$ and the image height on a focal plane is $h(\theta)>f*\theta$, where $h(\theta)$ is the image height formed by an off-axis chief ray having a field angle $\theta$, and f is the effective focal length of the lens.

22 Claims, 6 Drawing Sheets

ULTRA-WIDE ANGLE OBJECTIVE LENS

The application claims priority from U.S. provisional application 60/791,032 filed Apr. 10, 2006 for an Ultra-Wide Angle Imaging Lens having a common inventor.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable

REFERENCE TO A "MICROFICHE APPENDIX"

Not applicable.

REFERENCE TO SEQUENCE LISTING

Not applicable.

FIELD OF THE INVENTION

This invention relates to compact lenses for digital camera applications and, in particular, to very wide angle or fisheye lenses for very compact digital cameras. Such lens designs are incorporated into security cameras and other very small electronic devices.

BACKGROUND OF THE INVENTION

Imaging lenses with ultra wide field of view (with full field of view>=100° up to 180° FOV fisheye lenses) are required for many applications. Fisheye lenses are also commonly used for security and surveillance applications. New emerging applications include back-up cameras for cars, and interior monitoring cameras for buses and airplanes. Prior art designs of wide-angle lenses tend to have a significant amount of optical distortion. Examples of similar related inventions include U.S. Pat. No. 7,023,628 for a Compact Fisheye Objective Lens issued to Alex Ning on Apr. 4, 2006 and U.S. Pat. No. 6,844,991 for a Fisheye Lens issued to Keiko Mizuguchi on Jan. 18, 2005.

The low light performance of an FOV fisheye objective lens is important. The relative aperture of the lens must also be high. A lens relative aperture (also known as f/# of the lens) of less than or equal to 3 is generally preferred. There is also a need for small size and low weight for many emerging applications. The image quality of the lens must also be high for compatibility with mega pixel class electronic imagers.

Optical distortion of any lens can be characterized by its image height vs. field angle. The off-axis image height h is defined as the distance between the interception of an off-axis chief ray with the image plane, and the optical axis. The field angle is the angle θ between the off-axis chief ray and the optical axis. The image plane is defined as the best focal plane when the object is at infinite distance from the lens. FIG. 1 illustrates the definitions of the terms used.

Prior art fisheye lenses such as the DF1.8HB marketed by Fujinon in Japan use a large number of lens elements to obtain the performance requirements of a wide field of view, a large aperture and high image quality. However, the lens assembly is large, heavy and expensive to produce because of the large number of elements used. Additional examples of prior art fisheye lens designs are taught in U.S. Pat. Nos. 3,589,798, 3,597,049, 3,734,600, 3,737,214, 3,741,630, 4,412,726, 6,844,991, and also in JP Patents 63-017421, and 60-153018. The number of lens elements in the lenses taught by these references range from 8 to 12 elements.

The image height "h" that is produced on a focal or image plane by rays processed from an object to the pupil of an objective lens and then to an image plane is a function of field angle θ where θ is the angle that a chief ray makes with the optical axis of the lens and where the chief ray is propagating from an extreme point on the object to the center of the lens pupil. In a distortion free lens (also known as a rectilinear leans), the height of the image on the image plane is a function of the angle θ as characterized below in Equation 1.

$$h(\theta)=f^*\tan(\theta) \qquad \text{Eq. 1}$$

In Equation 1, the parameter "f" represents the effective focal length (EFL) of the lens. Most standard photographic lenses follow this relationship. However, as the field of view required increases, it becomes more difficult or impossible to design lenses that satisfy Equation 1. Objective or fisheye lenses that capture an ultra wide-angle image, are better characterized by Equation 2 as follows:

$$h(\theta)=f^*(\theta) \qquad \text{Eq. 2}$$

The angle θ in Equation 2 is given in radians. If a lens satisfies Equation 2, the lens is referred to as an "f-θ" lens. It should be understood that an image formed by a perfect "f-θ" lens will also be distorted. The image height "h" obtained by the above listed fisheye lenses including the image produced by the objective lens of U.S. Pat. No. 7,023,628 for a Compact fisheye objective lens that issued to Alex Ning, the common inventor on Apr. 4, 2006) satisfy Equation 3, below:

$$h(\theta)<f^*(\theta) \text{ for } \theta>0 \qquad \text{Eq.3}$$

SUMMARY OF PRESENT INVENTION

It is a present objective of the invention described herein to provide a level of performance that exceeds that of the prior art by meeting the requirements of Equation 4 below such that:

$$h(\theta)>f^*(\theta) \text{ for } \theta>0 \qquad \text{Eq.4}$$

The benefit of a lens that meets the requirements of Equation 4 lens is that it will refract the light rays from an off-axis object in such a way that the off axis objects are less "squeezed" than that of lenses satisfying Equation 3 above. A camera system using a lens designed to be in compliance with Equation 4 conveys more off-axis information and is known as "tailored distortion" lenses.

A second performance objective in the design is to achieve excellent optical performance up to 180° field of view and having a f/# as low as 2.0 and with a minimum number of lens elements.

The lens elements of the present invention are arranged into three groups, group 1, a first group (counting from the object side on the left of FIGS. 1, 2, 3 and 5) has at least two elements. At least one of the two elements is an aspheric element. An aspheric element is a lens element having at least one aspheric surface. The second group with a positive power has a single or multiple lens elements. The second group is labeled "group 2".

The third group has a positive optical power, and multiple elements. An aperture stop is positioned between group 2 and group 3. All lens groups and the aperture stop are coaxially aligned on a common optical axis.

BRIEF DESCRIPTIONS OF THE DRAWINGS

PREFERRED EMBODIMENT

Figure 1:
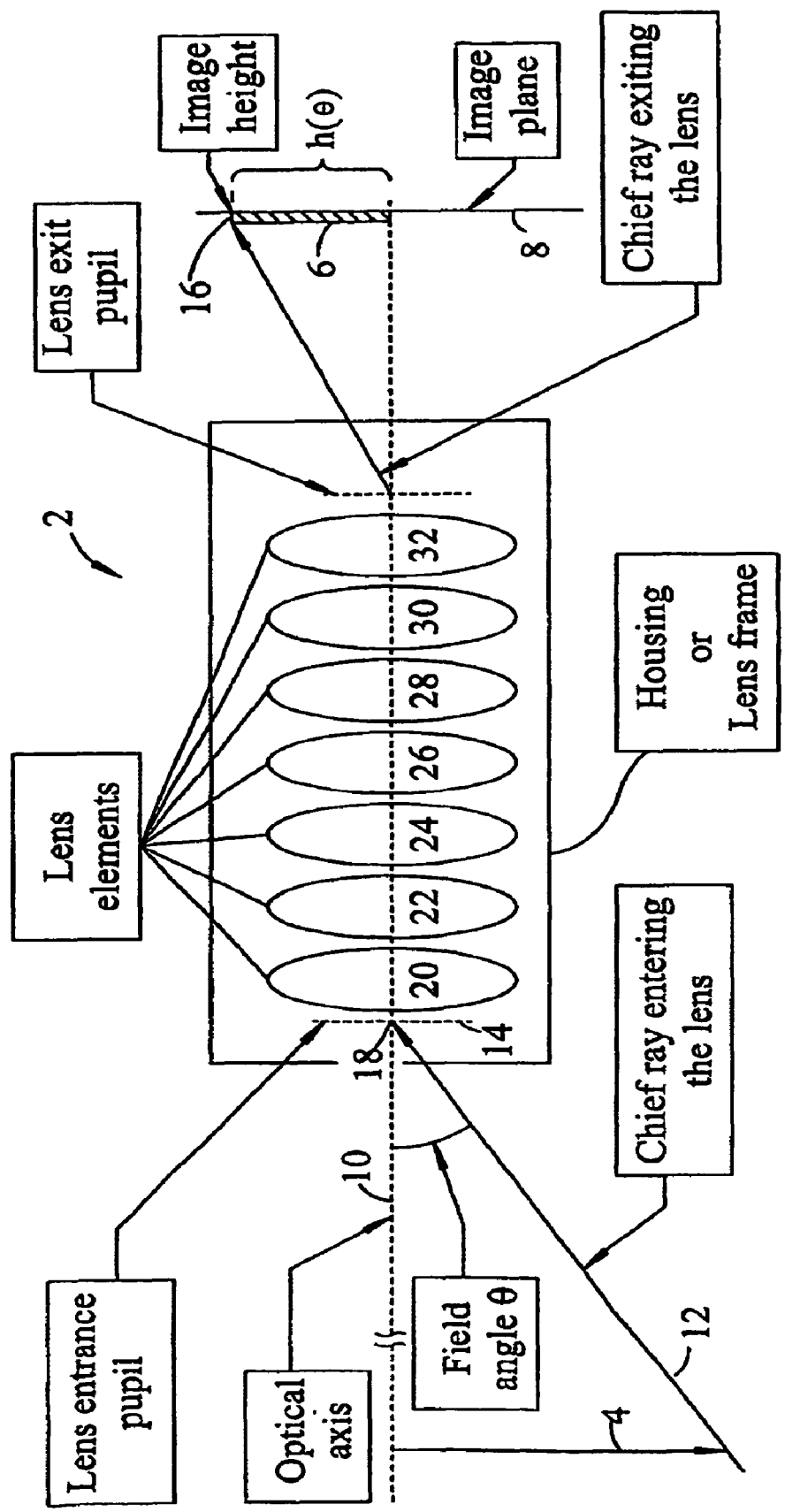
FIG. 1 is a schematic of a simplified and generalized view of an ultra-wide angle objective lens.

FIG. 1 is a generalized schematic of the invention ultra-wide angle objective lens 2 that receives light from object 4 which is shown pointing downward at the left of FIG. 1 in object space at an infinite distance from the ultra-wide angle objective lens 2. The ultra-wide angle objective lens 2 uses the light from object 4 to form an image 6, of the object 4, on the image plane 8.

The legend "Lens Entrance Pupil" is one of the several legends, each of which define an added feature on the optical schematic. The "optical axis" legend identifies the optical axis 10. The "field angle "θ" legend identifies the angle that a chief ray 12 makes with the optical axis 10 as the chief ray 12 enters the lens entrance pupil 14 The legend "Image height" locates the top of the image 16. The height of the image "h" is the distance from the optical axis 10 to the top of the image 16.

the chief ray 12 extends to the lens center at the entrance pupil center 18 and thereafter progresses through seven lens elements 20, 22, 24, 26, 28, 30, 32 and terminates at the top of the image 16. In identifying the surfaces of the lens elements in FIG. 1, the word "object" is used as an adjective before the word "surface" to identify a surface that faces object 4 at the left side of FIGS. 1, 2, 3 and 5. The word "image" is used as an adjective before the word "surface" to identify a surface that faces the image plane 8 at the right side of FIGS. 1, 2, 3 and 5.

Figure 2:
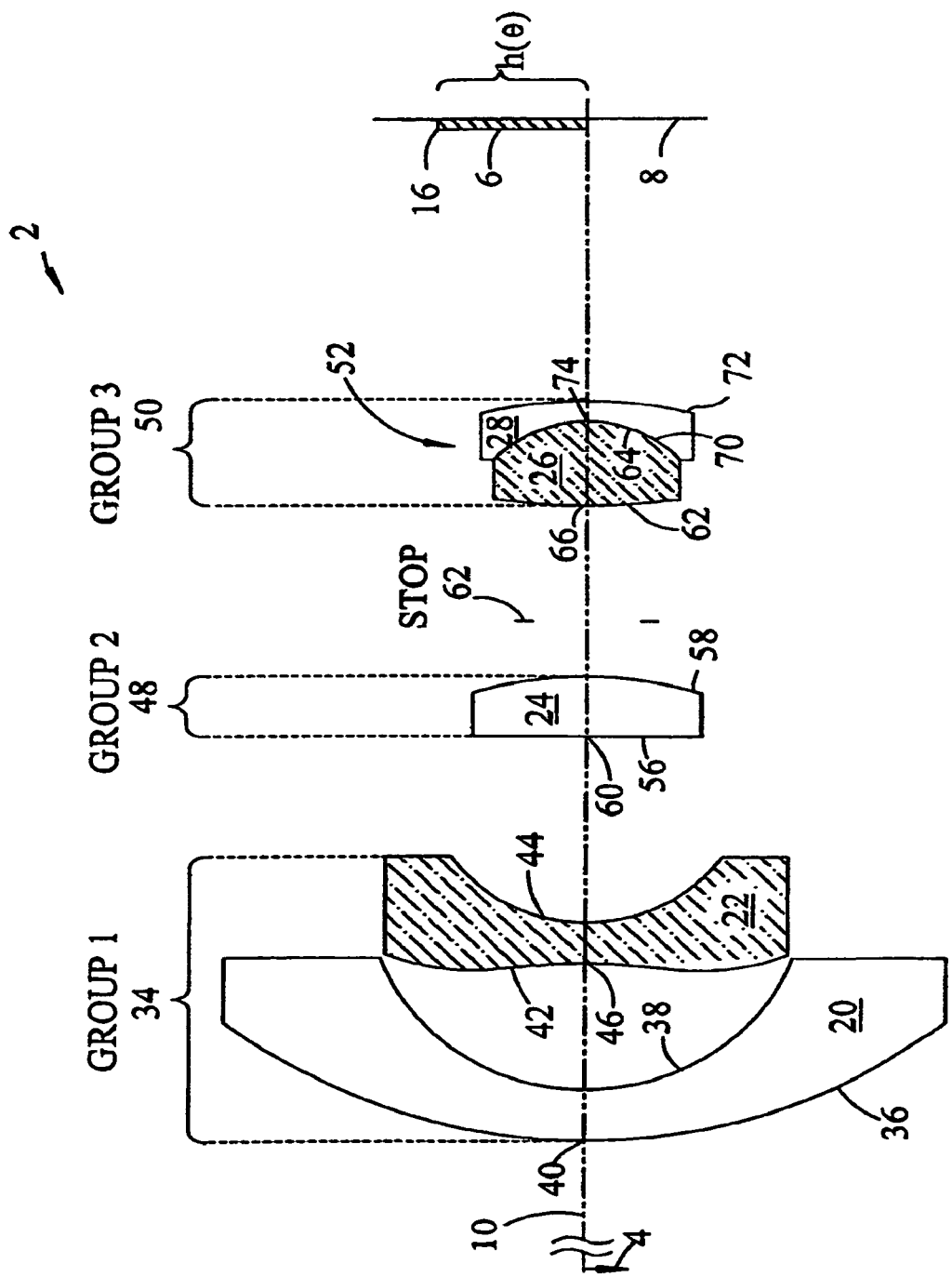
FIG. 2 is a schematic side sectional view of a first embodiment of an ultra-wide angle objective lens with three groups of lenses divided into five elements.

FIG. 2 shows three groups of elements, with a total of five elements. The embodiment of FIG. 2 is the simplest embodiment of the ultra-wide angle objective lens 2, group 1 under bracket 34 represents a first lens group. The first lens group 34 has a first lens element 20 and a second lens element 22. The first lens group 34 first lens element 20 has a convex object surface 36 facing the object 4, a concave image surface 38 lacing the image plane 8, and a vertex 40.

The first lens group 34 second lens element 22 has an object surface 42, an image surface 44 that is concave and a vertex 46. The second lens element 22 is shown spaced to the right of the first lens element concave image surface 38. The second lens element 22 has a varying power that is initially negative at its vertex 46. However, the power of the second lens element 22 increases positively with the radial distance from the vertex 46. For example, the power of the second lens element 22 might be −5 diopters at the vertex 46 increasing to −4 diopters at the edge of the element.

Figure 3:
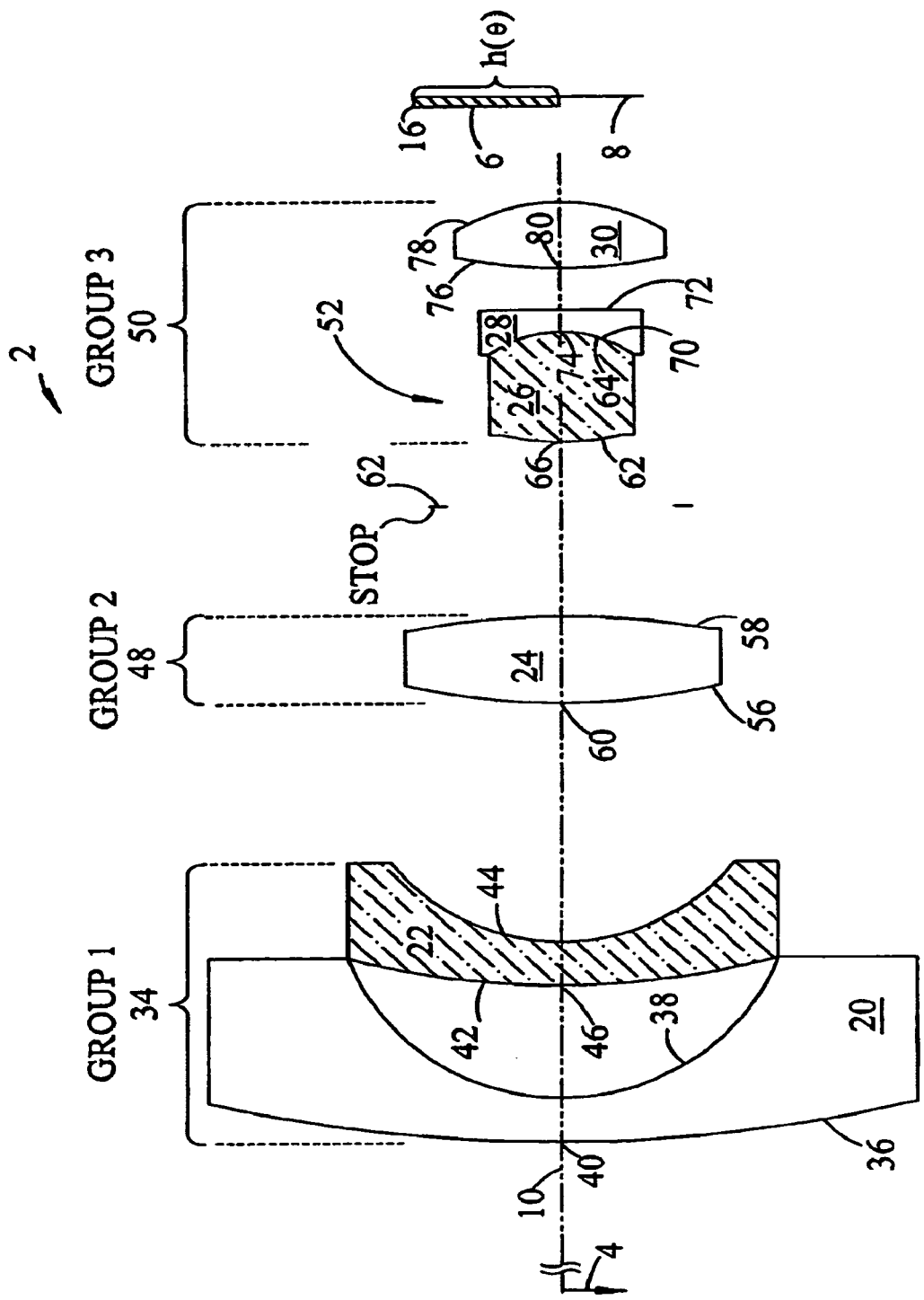
FIG. 3 is a schematic side sectional view of a second embodiment of an ultra-wide angle objective lens with three groups of lenses divided into six elements.
Figure 5:
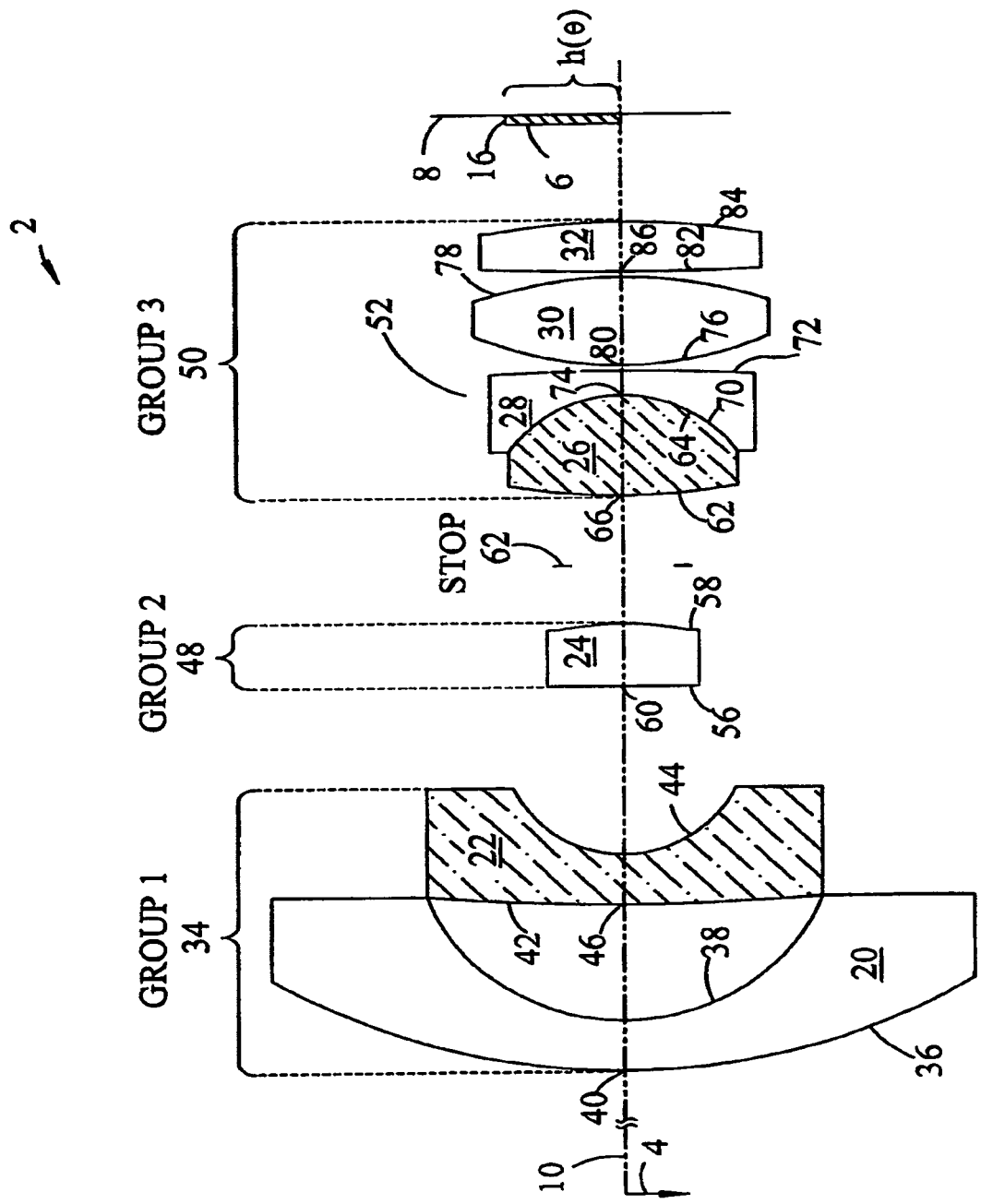
FIG. 5 is a schematic side sectional view of a third embodiment of an ultra-wide angle objective lens with three groups of lenses divided into seven elements.

The embodiments of FIGS. 2, 3 and 5 have similar element arrangements, for the first group, group 1, under bracket 34 and for the second group, group 2, under bracket 48. The third group, group 3 under bracket 50, has a doublet 52 with elements 26 and 28 bonded together.

FIG. 3 shows an embodiment of the ultra-wide angle objective lens 2 with three lens groups that have a total of six lens elements. The third lens group, the group 3 lens arrangement under bracket 50, includes doublet 52 with a fourth and fifth lens elements 26, 28 and with a sixth lens element 30.

FIG. 5 shows an embodiment of the ultra-wide angle objective lens 2 in which the third lens group, group 3, has a doublet 52 with a fourth and fifth lens elements 26, 28, a sixth lens element 30 and a seventh lens element 32. The description for the group 1 and group 2, topologies of the embodiments of FIGS. 2, 3 and 5 are common.

The second group, group 2 has a positive power and at least a first element 24. The second group first element 24 has an object surface 56 spaced to the right of the second lens element 22, an image surface 58 that faces the image plane 8 and a vertex 60. As shown in FIGS. 2, 3 and 5, all of the lens elements within the first, second, and third groups are coaxially aligned, on the optical axis 10 and sequentially spaced.

FIG. 2 is the least complex embodiment of the three embodiments presented in the Figures. The embodiments of FIGS. 2, 3 and 5 each show group 3, the third group under bracket 50 as a third lens group that is typically a cemented doublet 52.

Each doublet 52 has a first lens element 26 (which is the fourth lens element in the ultra-wide angle objective lens 2), and the second lens element 28 (which is the fifth lens element in the ultra-wide angle objective lens 2). The first lens element 26 has a convex object surface 62 facing the object 4, a convex image surface 64 facing the image plane 8 and a vertex 66. In each embodiment, the third group under bracket 50 has a positive power.

The second lens element in the doublet of the third lens group 50 or the fifth lens element of the ultra-wide angle objective lens 2, has a concave object surface 70 facing the object 4, a convex image surface 72 facing the image plane 8 and a vertex 74. The first and second tens elements 26, 28 of the doublet 52 are joined with optical cement to form the positively powered cemented doublet lens pair 46. The term positively powered means that the power of the cemented doublet pair 46 is greater than zero.

Improved performance is obtained by the embodiments of FIGS. 3 and 5 with the addition of a third lens element 30 to group 3 or the sixth lens element in the ultra-wide angle objective lens 2. The third lens element 30 has a convex object surface 76 facing the object 4, a convex image surface 78 facing the image plane 8, and a vertex 80.

The third lens element 30 in the third lens group 50 has a positive vertex power. In the embodiment of FIG. 3, the third lens element 30 in the third lens group 50 is an aspheric element having a varying power that is positive at the vertex 80 and that decreases with increasing radial distance from the vertex 80. For example, the power at vertex may be +5 diopters and it decreases to +4 diopters at the edge of the element.

Performance of the embodiment of FIG. 3 is further improved by the embodiment of FIG. 5 with the addition of a seventh lens element as the fourth lens element 32 in the third lens group. The fourth lens element 32 in the third group 50 has an object surface 82 facing the object 4, an image surface 84 facing the image plane 8, a vertex 86, and a positive vertex power. In the improved embodiment of FIG. 5, the fourth lens element in the third lens group 50 is an aspheric element having a varying power. The power is positive at the vertex 86 on lens surface 82, and decreases with increasing radial distance from the vertex 86. For example, the power at vertex may be +5 diopters mat decreases to +4 diopters at the edge of the element.

The prescription for the six element design of FIG. 3 appears in Tables 1 and 2 below. The prescription for the seven element design of FIG. 5 appears in Tables 3 and 4 below. The modeled performance of the design of FIG. 3 appears in the 4 graphs on FIG. 4. The modeled performance of the design of FIG. 5 appears in the 4 graphs on FIG. 6. The prescriptions for the elements and the lens designs for the embodiment of FIGS. 3 and 5 are characterized to provide a level of ultra-wide angle performance that meets the criteria of Equation 4 above.

Equation 4 is a function that defines the image height "h" as a function of θ where h(θ) is the image height, as shown in FIG. 1, as the distance from the top of the image 16 to the optical axis 12. The top of the image 16 is located by the off-axis chief ray that enters the pupil at the optical axis 10 with the field angle θ in radians. The parameter "f", sometimes written as "fo", in Equation 4 is the paraxial effective focal length of the ultra-wide angle objective lens 2, and it is measured on the optical axis 10 with an infinitesimally small bundle of rays.

In the preferred embodiments of FIGS. 3 and 5, the prescription of the elements in Tables 1-4 are also characterized to provide ultra-wide angle performance that meets the criteria of the inequality of Eq. 4 above and the inequality of Eq. 5 where:

$$TT/f < 33 \qquad \text{Eq. 5}$$

The embodiments of FIGS. 3 and 5 also provide a very compact lens design with a very short total track length (TT). The total track length is the distance from the first lens element vertex 48 to the image plane 8 when the object is at infinity. When the lens elements of the ultra-wide angle objective lens 2 are made to the prescriptions of Tables 1-4, the performance of the two embodiments of the ultra-wide angle objective lens 2 meets the criteria of the inequality of Eq. 5 as shown in the title blocks of Tables 1 and 3. The f/# (or "f" number) in the title blocks of Tables 1 and 3, is the ratio of the focal length "f" divided by the pupil diameter of the lens assembly.

Several commercial software packages such as Code V marketed by Optical Research Associates in Pasadena, Calif. and Zemax marketed by Zemax Corporation in Bellevue, Wash. are available for the design and modeling or analyzing the performance of alternative fisheye lens designs. The designs of FIGS. 3 and 5 are lens topologies and prescriptions obtained using Zemax software. The modeled transverse aberrations shown for the second and third embodiments by FIGS. 4 and 6 were obtained using the same Zemax software.

Aspheric Surfaces

Conventional lens elements are made by grinding and polishing glass lens blanks. The two surfaces of a lens element are typically spherical. However, an aspheric element is a lens element that has at least one of its two surfaces described by a general aspheric equation such as Equation 6 below where z is the surface sag relative to the vertex of the lens on the lens surface.

$$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}. \qquad \text{Eq. 6}$$

In Eq. 6, the variable r is the radial distance from the optical axis 10. The constant c is the curvature (inverse of radius) at the vertex of the surface. The constant k is a "conic" constant. The other coefficients ($\alpha_1$ 1, α2, ...) are the aspheric coefficients provided in Tables 2 and 4, The coefficients characterize the depressions in the lens surface that are made by molding the surface to match a modeled mathematical envelope in a suitable glass or plastic material. In the embodiments of FIGS. 3 and 5, surface 42 and 44 of element 22, surface 78 of element 30 in the embodiment of FIG. 3, and surface 84 of element 32 with the Embodiment of FIG. 5 are aspheric surfaces described by use of equation (5) above using the coefficients found in Table 2 for the embodiment of FIG. 3 or the coefficients found in Table 4 for the embodiment of FIG. 5.

Figure 4:
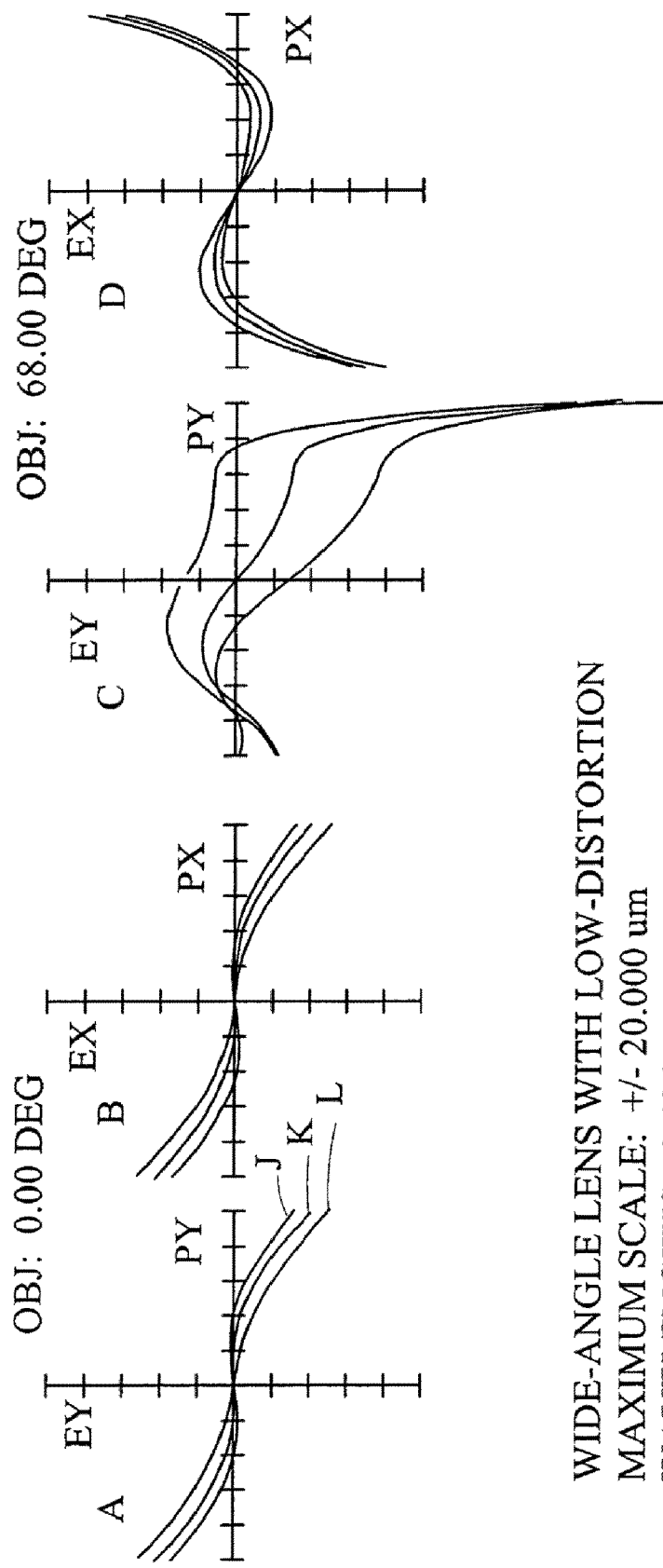
FIG. 4 represents transverse aberrations of the second embodiment.

Transverse Ray Aberrations of FIG. 4

FIG. 4 is a plot of the transverse ray aberrations of the embodiment of FIG. 3 with the elements of groups 1, 2 and 3 being made to the prescription of Tables 1 and 2. The optical performance of the lens of FIG. 3 according to the Transverse Ray Fan Plot of FIG. 4 is good. The preferred embodiment of FIG. 3 is a six element configuration that achieves the following optical properties:

Effective focal length=1.25 mm

F/#=2

Image height=2.24 mm at field angle of 68° f*θ=1.48 mm with Equation (4) is satisfied and with θ expressed in radians.

Figure 6:
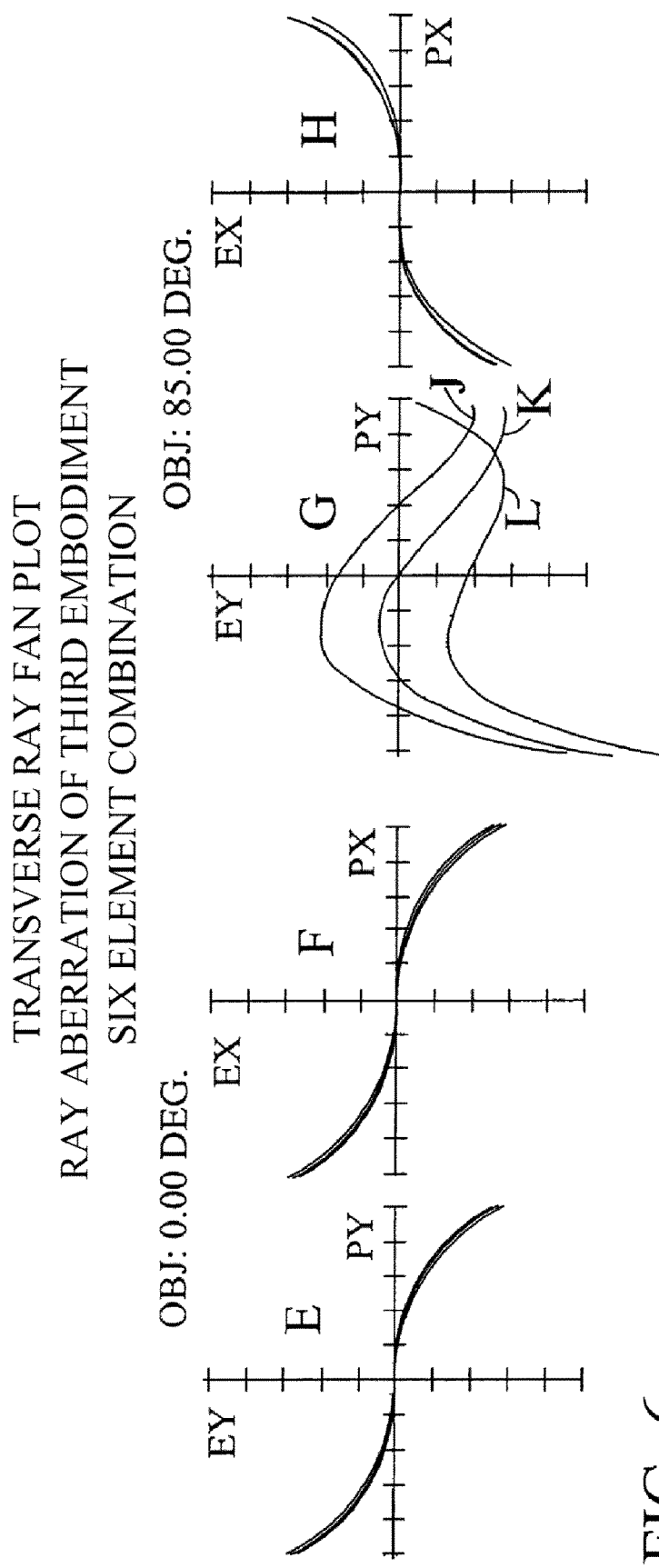
FIG. 6 represents transverse aberrations of the third embodiment.

Transverse Ray Aberrations of FIG. 6

FIG. 6 is a plot of the transverse ray aberrations of the embodiment of FIG. 5 with the elements of Groups 1, 2 and 3 being made to the prescription of Tables 3 and 4. The optical performance of the lens of FIG. 5 according to the Transverse Ray Fan Plot of FIG. 6 is good. The seven element embodiment of FIG. 5, achieves the following optical properties:

Effective focal length=1.04 mm

F/#=2

Image height=2 mm at field angle of 85°.

f*θ=1.54 mm. Equation (4) is satisfied and with θ expressed in radians.

FIG. 4 shows four graphs labeled A, B, C and D which are arrayed in two pairs. The independent variable (horizontal axis) is the relative coordinate of a ray over the pupil diameter. The vertical axis has a maximum distance measure of +/−20 μm (each tic mark is 4 μm). The vertical axis therefore represents the transverse ray aberration (ray interception distance from the ideal focal point) of a ray passing through a specific relative pupil position. Graphs A (tangential plane) and B (saggital plane) show the transverse ray aberrations for an on-axis ray bundle as the bundle is refracted through all lens elements.

In FIG. 4, Graphs A and B show the performance of the embodiment of the lens of FIG. 3 for a ray bundle at 0.0°. Graphs C and D show the performance of the lens of FIG. 3 for a ray bundle when the light source is moved providing an incident angle of 68° off the optical axis 10.

In FIG. 6, Graphs E and F show the performance of the embodiment of FIG. 5 for a ray bundle at 0.0°. Graphs G and H show the performance of the embodiment of FIG. 5 when the light source is moved provide an incident angle of 85°. Three curves appear on each of the eight Graphs. Each of the curves shows the performance of the lens at a different wavelength. Referring to Graph A on FIG. 4, curve J represents the aberration performance of the lens with light at 656 nm, curve K represents the performance at 588 nm and curve L represents the performance of the lens with light at 486 nm.

Explanation of Tables

The Title blocks at the top of Tables 1 and 3 provide the effective focal length f, the F#, the TT or Total Track, the Image Height h at the full field angle and the ratio of TT/f for the Embodiment The columns of Table 1 are titled for: "Surface", "Type", "Radius", "Thickness", "Index (Nd)", and "Abbe Number". The lens element material is specified by the refractive index and Abbe number. The absence of an "Index" value in a cell in Table 1 or Table 3 signals that the value in the "Thickness" column cell adjacent to the missing value in the Index cell, is the distance to the vertex of the next lens surface. The "Index" column provides the index of refraction for the material at 588 nm. The "Abbe Number" is provided in the rightmost column.

At Table 1, surface 6, the Index Cell is blank. Therefore, the adjacent cell to the left the "Thickness" column cell, shows the distance to be measured from the image surface of the preceding lens surface to the next surface which is the distance to the STOP. Surface 7, the start of the next row, is the start of the STOP row. Thickness Cell on Row 7 shows the distance from the STOP to vertex 66 on the first doublet lens 26. The distance from surface 58 on lens element 24 to the STOP is 3.621863 mm. The distance from the STOP to vertex 66 on surface 8 is 0.351858 for the embodiment of FIG. 3.

TABLE 2

Aspherical coefficients for Table 1

|  | EVENASPH |
|---|---|
| SURFACE 3 | |
| $\alpha_2$ | 0.0096451413 |
| $\alpha_3$ | −0.00024111637 |
| $\alpha_4$ | 4.8177247e−006 |
| SURFACE 4 | |
| $\alpha_2$ | 0.0038127915 |
| $\alpha_3$ | −0.00075997907 |
| $\alpha_4$ | −4.3674551e−005 |
| SURFACE 12 | |
| $\alpha_2$ | 0.0024421308 |
| $\alpha_3$ | −0.0015313569 |
| $\alpha_4$ | 0.00035745172 |

Table 3 is similar to Table 1 above. Tables 3 and 4, in combination, provide the lens prescription for the ultra-wide angle objective lens 2 of FIG. 5.

Referring now to Table 3, the STOP of the embodiment of FIG. 5 is 0.4076963 mm from the surface 58 of the third lens 24 and 2.145171 mm from the vertex 66 of the first doublet 26 in the embodiment of FIG. 5.

TABLE 1

Focal length f = 1.25 mm, F# = 2.0, Total trade TT = 23.9 mm, h = 2.24 mm at θ = 68° TT/fo = 19.1, and the relationship, h > f*θ is satisfied

| Surf | Type | Radius | Thickness | Index (Nd) at 588 nm | Abbe Number |
|---|---|---|---|---|---|
| OBJ | | Infinity | Infinity | | 0 |
| 1 | (20) (36) LENS 1 | 30.195559 | 1.00 | 1.788305 | 47.408839 |
| 2 | (20) (38) | 4.714786 | 2.572952 | | |
| 3 | EVENASPH (22) (42) LENS 2 | −5.885816 | 1 | 1.533275 | 56.380994 |
| 4 | EVENASPH (22) . . . (44) | 8.977563 | 5.442334 | | |
| 5 | (24) (56) LENS 3 | 12.80534 | 2 | 1.605237 | 25.425713 |
| 6 | (24) (58) | −16.00083 | 3.621863 | | |
| 7 | STOP | Infinity | 0.351858 | | |
| 8 | (26) . . . (62) LENS 4 | 5.019777 | 2.5 | 1.60413 | 60.285324 |
| 9 | (26), (64) LENS 4, 5 | −2.498944 | 0.5 | 1.846665 | 23.823498 |
| 10 | (28) (72) LENS 5 | −73.84479 | 0.9352133 | | |
| 11 | (30) (76) LENS 6 | 9.632366 | 1.5 | 1.533275 | 56.380994 |
| 12 | (30) (78) LENS 6 | −2.560853 | 2.499953 | | |
| IMA | STANDARD | Infinity | | | |

TABLE 3

Focal length f = 1.04 mm, F# = 2.0, Total track TT = 19.2, h = 2.0 mm @ θ = 85° Image height TT/f = 18.5, and the relationship h(θ) > f*θ is satisfied

| Surf | Type | Radius | Thickness | Index (Nd) at 588 nm | Abbe Number |
|---|---|---|---|---|---|
| OBJ | | Infinity | Infinity | | |
| 1 | (20) (36) LENS 1 | 11.88528 | 1.00 | 1.788309 | 47.403596 |
| 2 | (20) (38) | 3.087297 | 2.353107 | | |
| 3 | EVENASPH (22) (42) LENS 2 | −10.96813 | | 1.51160 | 56.043828 |
| 4 | EVENASPH (22) . . . (44) | 2.470199 | 3.38928 | | |
| 5 | (24) (56) LENS 3 | 2385.921 | 1.25 | 1.784715 | 25.752391 |
| 6 | (24) (58) | −5.530848 | 0.4076963 | | |
| 7 | STOP | Infinity | 2.145171 | | |
| 8 | (26) . . . (62) LENS 4 | 11.32515 | | 1.816003 | 46.607731 |
| 9 | (26), (28) (64) LENS 4, 5 | −2.498599 | 0.5 | 1.922860 | 20.880384 |
| 10 | (28) (72) LENS 5 | −37.41793 | 0.1 | | |
| 11 | (30) (76) LENS 6 | 6.390654 | 1.75 | 1.620414 | 60.272839 |
| 12 | (30) (78) LENS 6 | −7.987744 | 0.1 | | |
| 13 | (32) (82) LENS 7 | 49.82086 | 1.0 | 1.531160 | 56.043828 |
| 14 | (32) (84) LENS 7 EVENASPH | −4.536546 | 2.16371 | | |
| IMA | STANDARD | Infinity | | | |

TABLE 4

Aspherical coefficients for Table 3

EVENASPH

SURFACE 3

| | |
|---|---|
| $\alpha_2$ | 0.0093505721 |
| $\alpha_3$ | −0.00047948461 |
| $\alpha_4$ | 8.9979787e−006 |

SURFACE 4

| | |
|---|---|
| $\alpha_2$ | 0.0090047941 |
| $\alpha_3$ | 0.0015795791 |

SURFACE 14

| | |
|---|---|
| $\alpha_2$ | 0.014531543 |
| $\alpha_3$ | −0.00012713635 |
| $\alpha_4$ | −9.2744656e−006 |

For added embodiments, it might be possible to increase the number of the elements in the group 2. It might also be possible to use additional aspheric surfaces for some of the elements. The single positive element in group 3 could be replaced by a cemented doublet A key requirement of the present invention is that the first group, group 1, must contain at least two elements with at least one of them being aspheric, and it is preferable that the third group, contains at least one aspheric element and a cemented doublet.

While certain specific relationships, materials and other parameters have been detailed in the above description of preferred embodiments, it should be understood that those can be varied, where suitable, with similar results. Other applications and variations of the present invention will occur to those skilled in the art upon reading the present disclosure. Those variations are also intended to be included within the scope of this invention as defined in the appended claims.

What is claimed is:

1. A wide-angle objective lens for receiving light from an object and for forming an image of the object on an image plane, the objective lens comprising sequentially from object to image of a first lens group, a second lens group and a third lens group, and:
    a) the first lens group comprising sequentially from object to image: a first lens element with a convex object surface and a concave image surface; and a first aspheric lens element having a concave image surface and a varying power that is negative at a vertex thereof and increasingly positive with radial distance from the vertex;
    b) the second lens group having a positive power;
    c) the third lens group having a positive power, wherein: two of the lens elements of the third lens group are joined to form a doublet; and one of the lens elements of the third lens group is a second aspheric lens element,
    d) wherein the lens elements are positioned to produce an image height, formed by a chief ray on the image plane, that is greater than the product of 1.2 times a paraxial effective focal length of the wide-angle objective lens and a field angle in radians of a corresponding object, and,
    e) wherein the total track length divided by the effective focal length of the wide-angle objective lens is greater than 15 and less than 25.

2. The wide-angle objective lens of claim 1 wherein the second aspheric lens element is positioned closer to the image plane than the doublet.

3. The wide-angle objective lens of claim 2 wherein the second aspheric lens element has a varying power that is positive at a vertex thereof, the varying power decreasing with increasing radial distance from the vertex.

4. The wide-angle objective lens of claim 1 wherein the third lens group comprises a further lens element having a positive power.

5. The wide-angle objective lens of claim 1 wherein the third lens group comprises a third aspheric lens element having a varying power that is positive at a vertex thereof, the varying power decreasing with increasing radial distance from the vertex.

6. The wide-angle objective lens of claim 1 wherein the effective focal length of said wide-angle objective lens is less than 1.3 millimeters.

7. The wide-angle objective lens of claim 1 wherein the total number of lens elements with non-zero power is no more than seven.

8. A wide-angle objective lens for receiving light from an object and for forming an image of the object on an image plane, the objective lens consisting sequentially from object to image of a first lens group, a second lens group and a third lens group, and,
   a) said first lens group consisting sequentially from object to image of a first lens element nearest the object and a second lens element, adjacent to the first lens element, where the first lens element has a convex object surface and a concave image surface and the second lens element has an object surface and a concave image surface, is aspheric, and, has a varying power which is negative at its vertex and is increasing positively with radial distance from the vertex, and
   b) the second lens group having a positive power and consists of one lens element, and
   c) consisting of an aperture stop located between the second lens group and the third lens group,
   d) the third lens group having a positive power and consisting of first and second lens elements said first and second elements joined to form a positively powered cemented doublet and located adjacent to the aperture stop, and
   e) the total track length divided by the effective focal length of the wide-angle objective lens is greater than 15 and less than 25, and,
   f) $h(\theta) \geq 1.2 * f * \theta$
   where $h(\theta)$ is the image height formed by an off-axis chief ray having a field angle $\theta$ in radians and f is the paraxial effective focal length of wide-angle objective lens.

9. The wide-angle objective lens of claim 8 wherein the effective focal length of the wide-angle objective lens is less than 1.3 millimeters.

10. A wide-angle objective lens for receiving light from an object and for forming an image of the object on an image plane, the objective lens comprises sequentially from object to image of a first lens group, a second lens group and a third lens group, and,
    a) said first lens group consisting from object to image of a first lens element nearest the object and a second lens element, adjacent to the first lens element, where the first lens element has a convex object surface and a concave image surface and the second lens element is aspherical and has an object surface and a concave image surface, and
    b) the second lens group having a positive power, and
    c) comprising an aperture stop located between the second lens group and the third lens group,
    d) the third lens group having a positive power and comprising a first and a second lens elements said first and second elements joined to form a positively powered cemented doublet and located adjacent to the aperture stop, and an aspheric element singlet lens having a positive power at its vertex, and
    e) wherein the total track length divided by the effective focal length of the wide-angle objective lens is greater than 15 and less than 25, and,
    f) wherein $h(\theta) \geq 1.2 * f * \theta$ where $h(\theta)$ is the image height formed by an off-axis chief ray having a field angle $\theta$ in radians and where f is the paraxial effective focal length of the wide-angle objective lens.

11. A wide-angle objective lens for receiving light from an object and for forming an image of the object on an image plane, the objective lens comprising sequentially from object to image of a first lens group, a second lens group and a third lens group, and,
    a) said first lens group consisting from object to image of a first lens element nearest the object and a second lens element, adjacent to the first lens element, where the first lens element has a convex object surface and a concave image surface and the second lens element is aspherical and has an object surface and a concave image surface, and
    b) the second lens group having a positive power, and
    c) comprising an aperture stop located between the second lens group and the third lens group,
    d) the third lens group having a positive power and consisting of:
       i) first and second lens elements said first and second elements joined to form a positively powered cemented doublet and located adjacent to the aperture stop,
       ii) a third lens element singlet lens having a positive power at its vertex, and,
       iii) a fourth lens element singlet lens which is aspherical, and
    e) wherein the total track length divided by the effective focal length of the wide-angle objective lens is greater than 15 and less than 25, and,
    f) wherein the first, second and third lens group elements are selected and positioned such that:

$h(\theta) \geq 1.2 * f * \theta$ where $h(\theta)$ is the image height formed by an off-axis chief ray having a field angle $\theta$ in radians, and where f is the paraxial effective focal length of the wide-angle objective lens.

12. The wide-angle objective lens of claim 10 in which the aspheric element in the first lens group has a varying power which is negative at its vertex and is increasing positively with radial distance from the vertex.

13. The wide-angle objective lens of claim 11 in which the aspheric element in the first lens group has a varying power which is negative at its vertex and is increasing positively with radial distance from the vertex.

14. The wide-angle objective lens of claim 10 in which the aspheric element in the third lens group has a varying power that is positive at the vertex its power decreasing with increasing radial distance from the vertex.

15. The wide-angle objective lens of claim 11 in which the aspheric element in the third lens group has a varying power that is positive at the vertex its power decreasing with increasing radial distance from the vertex.

16. The wide-angle objective lens of claim 10 where the effective focal length of said wide-angle objective lens is less than 1.3 millimeters.

17. The wide-angle objective lens of claim 10 in which the aspheric element in the first lens group has a varying power which is negative at its vertex and is increasing positively with radial distance from the vertex.

18. The wide-angle objective lens of claim 11 in which the aspheric element in the first lens group has a varying power which is negative at its vertex and is increasing positively with radial distance from the vertex.

19. A wide-angle objective lens for receiving light from an object and for forming an image of the object on an image plane, the objective lens comprising sequentially from object to image of a first lens group, a second lens group and a third lens group, and:
   a) the first lens group including: a lens element with a convex object surface and a concave image surface; and a first aspheric lens element having a concave image surface, and a varying power that is negative at a vertex thereof and increasingly positive with radial distance from the vertex;
   b) the second lens group having a positive power;
   c) the third lens group having a positive power, wherein: two of the lens elements of the third lens group are joined to form a doublet; and one of the lens elements of the third lens group is a second aspheric lens element, and,
   d) the third lens group comprises a third aspheric lens element having a varying power that is positive at a vertex thereof, the varying power decreasing with increasing radial distance from the vertex.

20. The wide-angle objective lens of claim 19 wherein the first, second and third lens group elements are selected and positioned such that:

$$h(\dot{\theta}) \geq 1.2 * f * \theta \text{ and } 15 \leq TT/f \leq 25$$

where $h(\theta)$ is the image height formed by an off-axis chief ray having a field angle $\theta$ in radians, TT is the total track length of the wide-angle objective lens, and where f is the paraxial effective focal length of the wide-angle objective lens.

21. A wide-angle objective lens for receiving light from an object and for forming an image of the object on an image plane, the objective lens comprising sequentially from object to image of a first lens group, a second lens group and a third lens group, and,
   a) said first lens group comprising from object to image of a first lens element nearest the object and a second lens element, adjacent to the first lens element, where the first lens element has a convex object surface and a concave image surface and the second lens element has an object surface and a concave image surface, is aspheric, and, has a varying power which is negative at its vertex and is increasing positively with radial distance from the vertex, and
   b) the second lens group having a positive power and comprising at least one lens element, and
   c) comprising an aperture stop located between the second lens group and the third lens group,
   d) the third lens group having a positive power and comprising at least a first and a second lens elements said first and second elements joined to form a positively powered cemented doublet and located adjacent to the aperture stop,
   e) wherein the third lens group further comprises a third lens element singlet lens having a positive power at its vertex, said third lens element of the third lens group is aspherical having a varying power that is positive at the vertex its power decreasing with increasing radial distance from the vertex,
   f) further comprising a fourth lens element of the third lens group that is aspherical.

22. The wide-angle objective lens of claim 21 wherein the first, second and third lens group elements are selected and positioned such that:

$$h(\theta) \geq 1.2 * f * \theta \text{ and } 15 \leq TT/f \leq 25$$

where $h(\theta)$ is the image height formed by an off-axis chief ray having a field angle $\theta$ in radians, TT is the total track length of the wide-angle objective lens, and where f is the paraxial effective focal length of the wide-angle objective lens.

* * * * *